Patented June 13, 1933

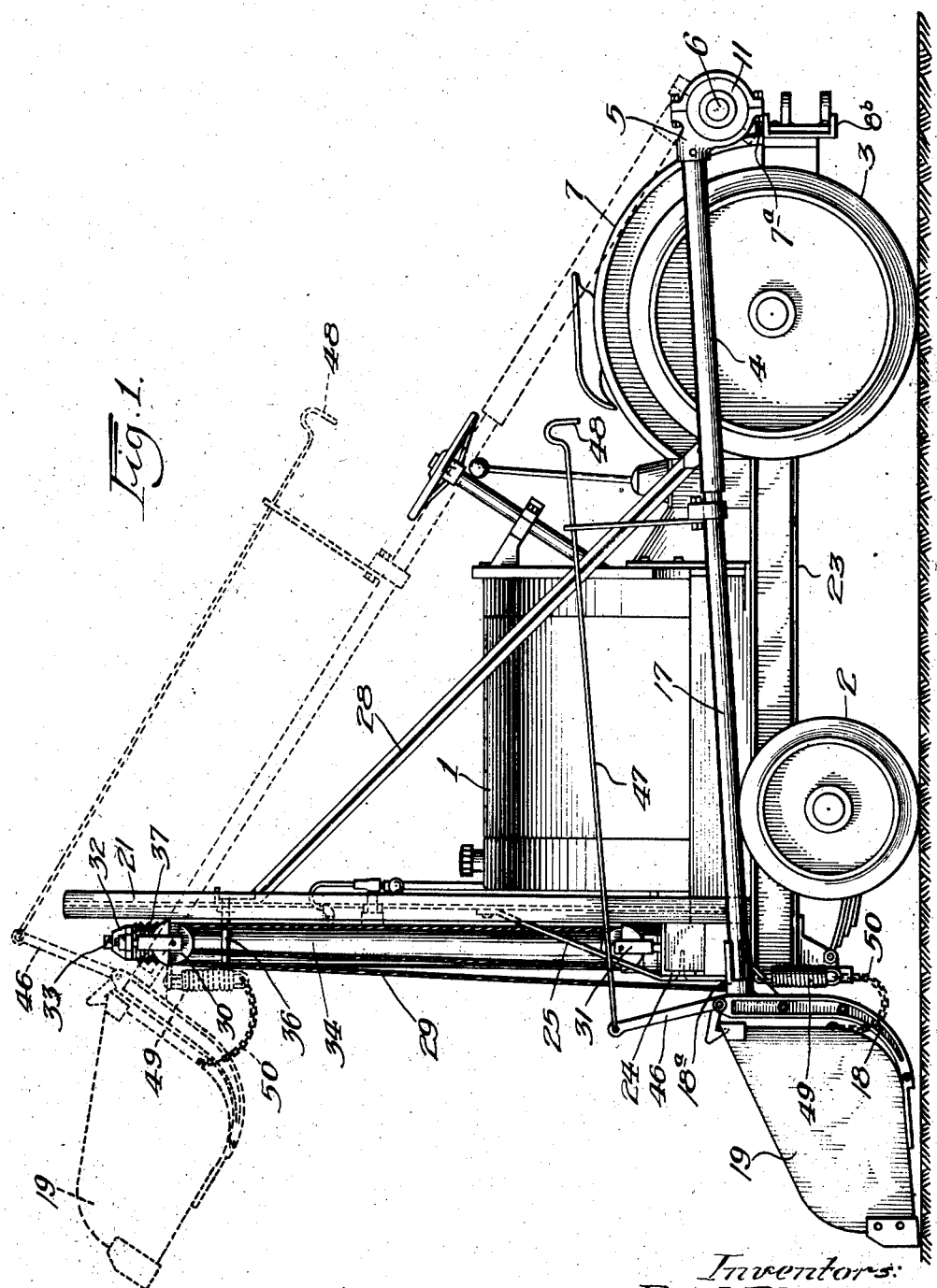

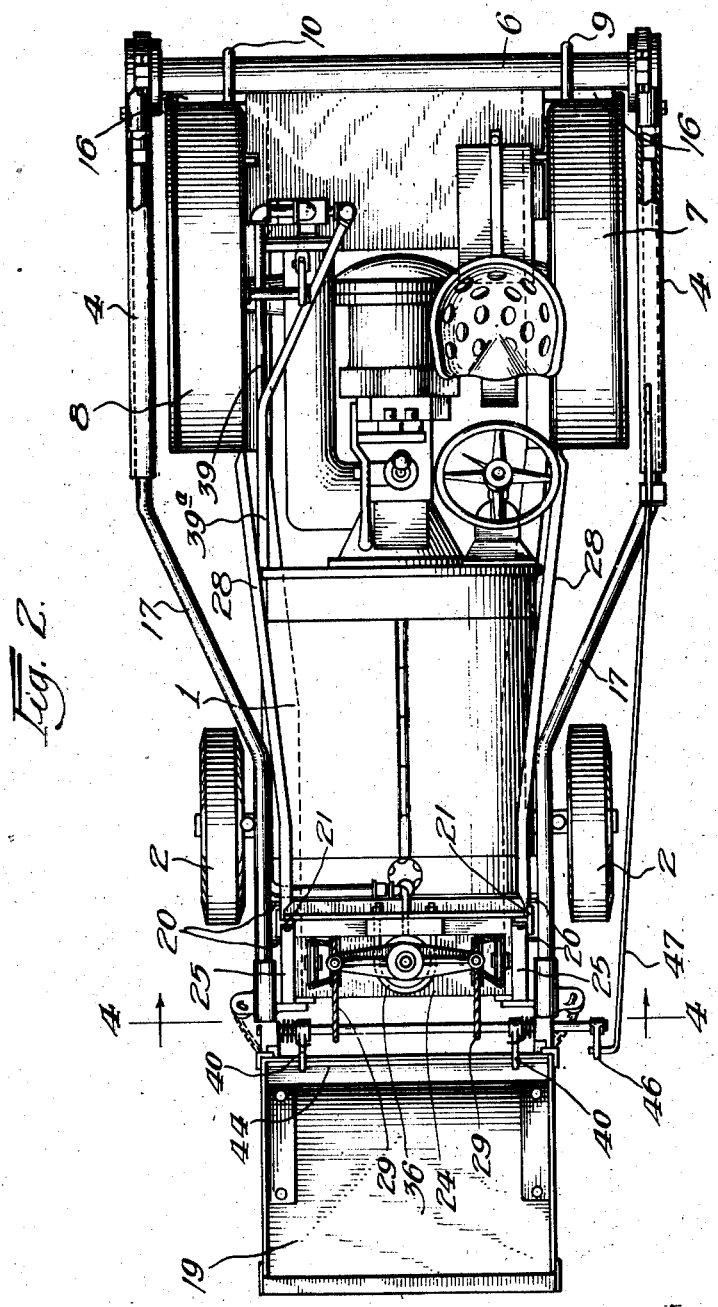

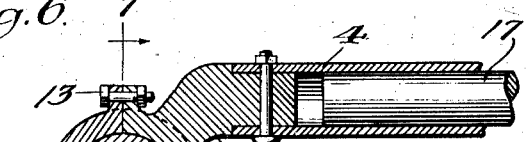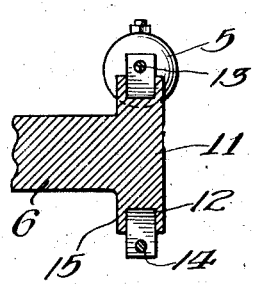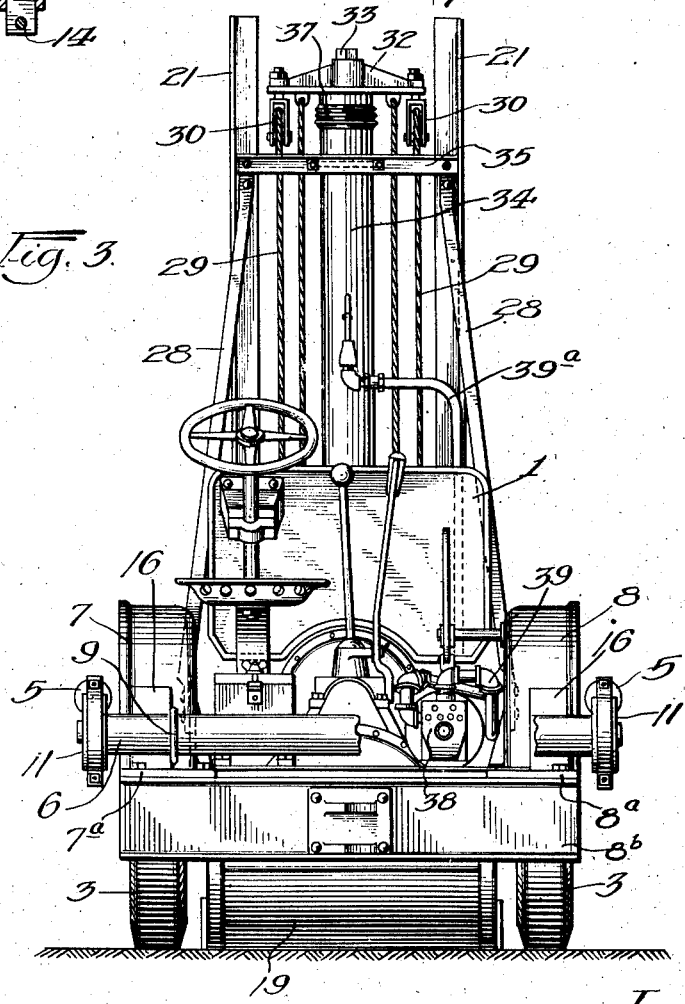

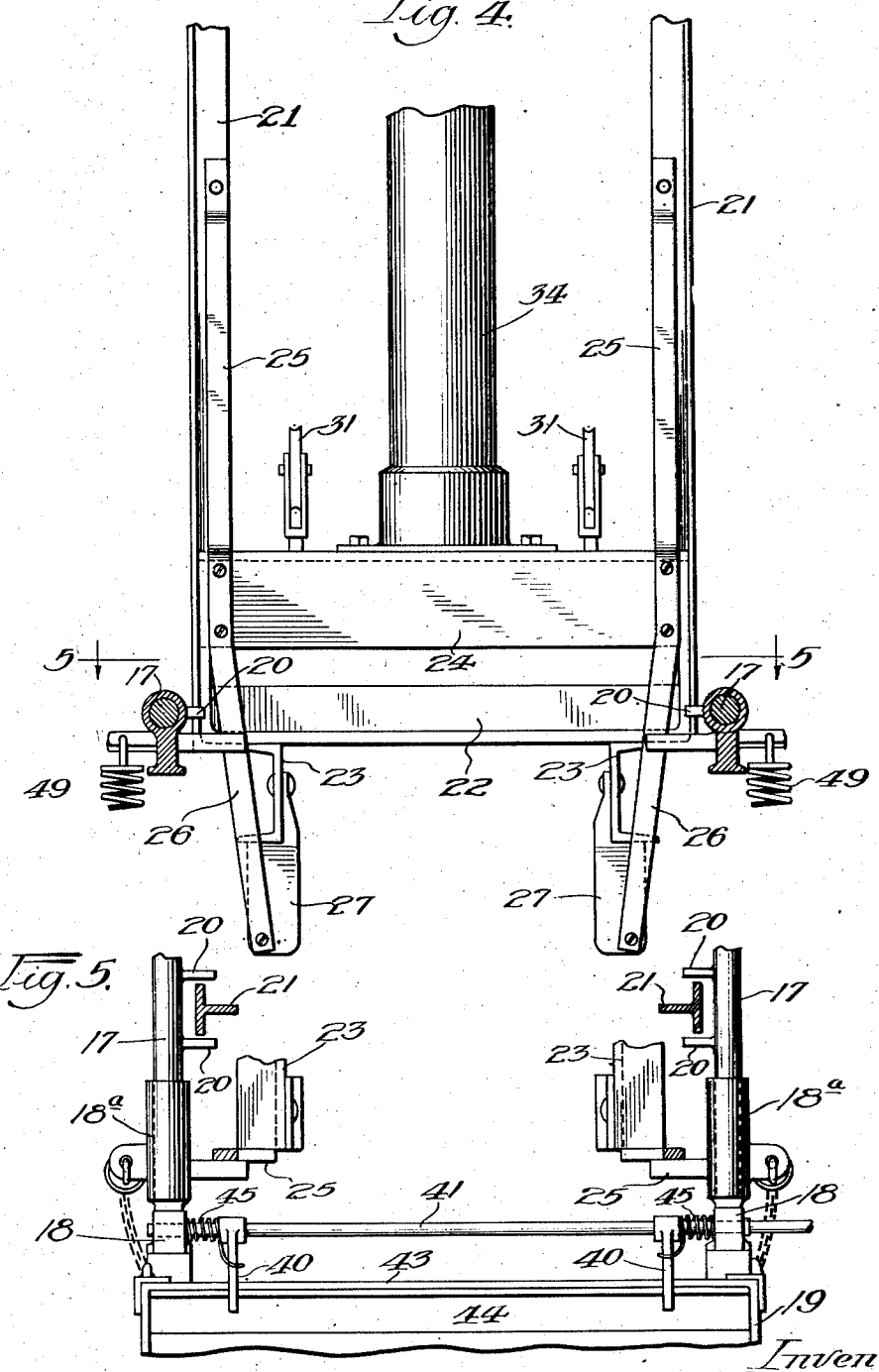

1,913,472

UNITED STATES PATENT OFFICE

PAUL BLUMBERG, OF NEW HOLSTEIN, WISCONSIN, AND FRANK G. HOUGH, OF CHICAGO, ILLINOIS, ASSIGNORS TO WILLIAM MITCHELL BLAIR, OF CHICAGO, ILLINOIS

HYDRAULIC DIGGER

Application filed May 18, 1929. Serial No. 364,215.

This invention relates to hydraulic diggers, and more particularly to the provision of such a construction adapted for attachment with a tractor or prime mover, and adapted to lift material to a relatively great altitude, or to intermediary positions.

Among the objects of our invention, are to provide a hydraulic digger and loader of novel construction, and adapted to be readily operated by the operator of the tractor or prime mover; further to provide a novel construction of lifting means for said digger and loader; further to provide a novel means of attaching the mechanism to a tractor or prime mover, so that the thrust on the mechanism, due to the lifted load, will be more effectively and evenly distributed over the tractor or prime mover, and will be eliminated from the rear axle thereof; to provide a novel construction wherein the various members making up the mechanism are so constructed that replacements and adjustments may be readily accomplished; further to provide a hydraulic digger and loader of maximum simplicity, efficiency, economy and ease of operation; and such further objects, advantages, and capabilities, as will later more fully appear.

Our invention further resides in the combination, construction and arrangement of parts illustrated in the accompanying drawings, and while we have shown therein a preferred embodiment, we desire it to be understood that the same is susceptible of modification and change, without departing from the spirit of our invention.

In the drawings:

Fig. 1 is a view in side elevation of our hydraulic digger and loader, disclosing the same as combined with a tractor, and showing the bucket both in raised and lowered position.

Fig. 2 is a top plan view of the entire mechanism.

Fig. 3 is a view in end elevation, with a part thereof broken away, and showing the attachment of the elevating mechanism to the tractor.

Fig. 4 is a fragmentary view in cross section taken on the line 4—4 of Fig. 2.

Fig. 5 is a fragmentary horizontal cross sectional view taken on the line 5—5 of Fig. 4.

Fig. 6 is a fragmentary view in vertical cross section, taken through the end of one of the booms and rear shaft and showing the connection thereof.

Fig. 7 is a fragmentary vertical cross sectional view taken on the line 7—7 of Fig. 6.

Referring now more in particular to the drawings, the numeral 1 designates generally a tractor provided with front sterable wheels 2, the rear driving wheels 3. Our novel construction of hydraulic digger and loader is adapted to be applied to the ordinary tractor, this construction being clearly disclosed in Figs. 1, 2 and 3 of the drawings.

The booms for raising the bucket comprise a tubular arm 4, secured to a split casting 5, which casting is pivotally mounted upon the shaft 6, transversely disposed at the rear of the tractor 1, and attached to the guards 7 and 8 by means of the U-bolts 9 and 10. The U-bolts 9 and 10 pass around the shaft 6 and are drawn tight to hold the shaft in position by nuts which engage the threaded end of the U-bolts on the inner side of the guard. Other attaching means, however, may be used to connect the shaft to the tractor and hold the same in a rigid horizontal position.

The enlarged ends or hubs 11 of the shaft 6 are provided with an annular groove 12, adapted to receive the split casting 5, which engages and is drawn into place sufficiently tight to permit rotation, by the bolts 13 and 14, as is shown in Figs. 6 and 7 of the drawings. The casting 5 engages the annular ring 12, and is prevented from lateral displacement by the flanged sides 15 of this groove 12. If heavy material is being loaded or removed by the mechanism, it may be desirable to provide shims 16 between the shaft 6 and the guards 7 and 8 to more adequately distribute the load transmitted from the bucket, to the shaft 6 and the guards 7 and 8. The advantage of providing this shaft 6 at the rear of the tractor and connecting the booms thereto, in preference to connecting these booms to the axle or other part or parts of the tractor, which might be done, is to distribute the load over a greater area and insuring a longer life to the parts upon which this thrust is directed.

Slidably mounted in the tubular arm or sleeve 4 is an arm or member 17, the front end of which is suitably attached to the arcuate bucket bracket 18 through a sleeve 18ª, for holding the bucket or scoop 19. The sleeve or arm 4 is located outwardly of the guard, and parallel to the longitudinal axis of the tractor, the arm 17 at the central portion of the tractor is bent inwardly and extends forwardly and inwardly of the front wheel 2, and at its forward end is normal to the bucket 19. As clearly shown in Fig. 6 of the drawings, the shaft 17 will butt against the casting 5, when a slight amount of pressure is applied to the bucket 17 or forward end of this shaft. By this construction of the boom and its attachment to the shaft, the entire thrust in digging or loading position is taken directly against the shaft 6, and distributed to the guards 7 and 8 over an enlarged area thereof. The guards 7 and 8 are provided with outstanding flanges 7ª and 8ª respectively, which are connected to the cross member 8ᵇ which in turn is suitably connected to the tractor 1.

The guide lugs 20 on the forward end of the arm 17, engage the vertical T-beams 21, which are mounted on the opposite sides of the forward end of the tractor. These T-beams 21 are rigidly connected to the angle iron 22, which is transversely disposed on the longitudinal channels 23, on opposite sides of the tractor frame-work, and to a cylinder bracket 24. Knee brackets 25 are further provided for bracing the upright beams, which knee brackets are in turn attached to the cylinder bracket 24, and the downwardly extending ends 26 of which, are attached to the brackets 27 beneath the channels 23. Diagonal bracing means 28, such as rods, angles or other suitable connection, are attached to the housing, rear guard or frame work of the tractor at their lower end and to the flanges of the upright T-beam at their upper end. The construction of these diagonal bracing means provides a rigid construction and holds the upright members in fixed position.

Cables 29 are attached by any suitable means to the bucket 19. These cables pass over an upper pulley 30, and then over a lower pulley 31, and the upper end of the cable is then attached to a cross-head 32, thus providing a three part line for increasing the speed of lift of the bucket. This cross head 32 is mounted on the upper end of the piston rod 33 of a piston (not disclosed) mounted in the cylindrical casing 34. The lower portion of the cylindrical casing 34 is mounted on the bracket 24, and its upper end is braced by means of the plate 35, provided with a U-bolt 36, passing around the cylinder or casing 34. The piston rod is enclosed and protected from the grit and dirt by means of a collapsible canvas boot 37. Hydraulic means 38, located in the tractor 1, having an intake 39 and outlet pipe line 39ª, provides the means for raising and lowering the bucket 19. These hydraulic means may be of any suitable design or construction, which are readily and easily attached to the tractor and connected to the casing 34.

In order to trip the bucket or scoop when desired, we provide a latching or tripping mechanism, including a pair of latches 40, mounted upon a shaft 41 suitably journalled in the top of the arcuate bucket brackets 18, which brackets in turn are pivotally connected to the under side of the bucket 19. Mounted at the top and on the interior wall 43, of the bucket 19, is an angle iron 44 adapted to be engaged by the latches 40. Springs 45 attached to the arm member 18, and engaging the latches 40, normally hold the latches in engagement with the bucket, although the springs do not prevent the ready disengagement of the latches from the latch plate or angle 44, by the operator. A lever arm 46 is mounted upon the extended end of the shaft 41, and is attached at its upper end to a rod 47, journalled in the bracket or arm 48. The rod 47 is provided with a handle 48, conveniently located adjacent to the operator's seat.

In order to control the degree of tipping of the bucket 19, springs 49 are attached to the sleeve 18ª, and are connected to the chain 50, which in turn is attached to the bucket 19. The length of chain and the degree of resiliency of the spring determines the range of the tipping of the bucket. Either the length of the chain 50 may be varied or a spring having a greater or less degree of resiliency may be provided to give the degree of tipping of the bucket that is desired.

In initial or loading operation, the bucket is generally lowered to the position shown in Fig. 1 of the drawings. After the bucket has been loaded, the operator, by suitable hand controlled levers, operates the hydraulic means to force the fluid under pressure through the intake pipe, to the base of the cylinder 30, and thus forcing upwardly the piston in the cylinder casing 34. When the bucket has been raised to the position or altitude desired, the operator, by means of the hand controlled levers, causes the flow of the fluid to cease, and hold the bucket in that position. The operator then pulls upon the handle 48, disengaging the trip mechanism from the bucket and allowing the bucket to discharge its load. The operator next lowers the bucket by moving the hand controlled levers to allow the fluid to flow back into the compressing chambers of the hydraulic means. As the bucket touches the ground, it is tilted upwardly, and the latches will engage the rear edge of the bucket for holding it in normal operative position.

Having thus disclosed the invention, we claim:

1. In a hydraulic digger and loader mounted on a tractor, telescoping booms at the opposite sides of said tractor, a shaft on the rear of said tractor and spaced from the rear axle thereof, said booms being pivotally mounted on said shaft whereby said shaft takes the thrust of the booms, a bucket mounted on the forward ends of said booms, and means for extending said booms as the bucket is being raised.

2. In a hydraulic digger and loader adapted for attachment to a tractor, a shaft mounted rearwardly of the rear axle of said tractor, telescoping booms positioned at the opposite sides of the tractor and pivotally mounted on said shaft whereby said shaft takes the thrust of the booms, the forward ends of said booms being provided with arcuate arms for holding a bucket, vertical beams mounted on the opposite sides of said tractor, and lugs on said booms and engaging said vertical beams when the booms are being raised.

3. In a hydraulic digger and loader mounted upon a prime mover and provided with a bucket, a shaft at the rear of said tractor, said shaft being provided with hubs, telescoping booms positioned at the opposite sides of said prime mover, said booms being mounted upon castings adapted to encircle said hubs, vertical beams mounted on the opposite sides of said tractor, and lugs mounted on said booms near the forward end thereof and adapted to engage the vertical beams for guiding said booms as they are being raised to discharge the contents of the bucket.

4. In a digger and loader mounted upon a prime mover, telescoping booms positioned at the sides of said prime mover, a shaft providing a pivotal mounting for said booms and positioned rearwardly of the rear axle of said prime mover whereby said shaft takes the thrust of said booms, a bucket mounted on the forward end of said booms, means for elongating said booms as the bucket is being raised, and means for tripping said bucket so as to discharge the contents thereof.

5. In a digger and loader mounted upon a tractor having rear guards, a shaft at the rear of the tractor and mounted on said guards, telescopic booms positioned at the side walls and pivotally connected to said shaft whereby said shaft takes the thrust of the booms, a bucket mounted on said booms, vertical beams mounted on the side walls of said tractor for guiding said booms, hydraulic means for raising and lowering of said bucket, and a three-part cable operated by said hydraulic means for raising said booms and bucket.

6. In a hydraulic digger and loader adapted to be mounted on a prime mover and provided with a bucket, an auxiliary shaft at the rear of said tractor, said shaft being provided with hubs, telescoping booms positioned at the opposite sides of the prime mover, said booms being mounted in castings adapted to encircle said hubs, vertical beams mounted on the opposite sides of said tractor, and lugs mounted on said booms near the forward end thereof and adapted to engage the vertical beams for guiding said booms as they are being raised to discharge the contents of the bucket.

7. In a hydraulic digger and loader adapted to be mounted on a tractor provided with rear guards, a shaft attached to the guards, telescoping booms positioned at the opposite sides of the tractor, said booms being pivotally mounted on said shaft whereby said shaft takes the thrust of the booms, a bucket at the forward end of said booms, and means for raising and lowering said bucket and extending said booms.

8. In a hydraulic digger and loader adapted to be mounted on a tractor, a cross member therefor, rear guards on said tractor and connected to said cross member, a shaft connected to the guards, telescoping booms positioned at the opposite sides of the tractor, said booms being pivotally mounted on said shaft whereby said shaft takes the thrust of the booms, a bucket at the forward end of said booms, and means for raising and lowering said bucket and extending said booms.

9. In a hydraulic digger and loader adapted for attachment to a tractor, telescoping booms positioned at the opposite sides of the tractor, means for pivotally mounting said booms rearwardly of the rear axle of said tractor whereby said mounting means takes the thrust of the booms, a bucket mounted on the forward ends of said booms, and upright members mounted on opposite sides of said tractor for guiding said booms when the same are being raised or lowered.

10. In a hydraulic digger and loader adapted for attachment to a tractor, telescoping booms positioned at the opposite sides of the tractor, means for pivotally mounting said booms rearwardly of the rear axle of said tractor whereby said mounting means takes the thrust of the booms, a bucket mounted on the forward ends of said booms, upright members mounted on opposite sides of said tractor, and means carried by said booms adapted to engage said members for guiding said booms when the same are being raised or lowered.

11. In a hydraulic digger and loader adapted for attachment to a tractor, telescopic booms on opposite sides of the tractor, an auxiliary shaft at the rear of said tractor on which said booms are pivotally mounted and which is adapted to receive the force of the digging operation through said booms, hydraulic means for raising and lowering said booms, said booms being extended when raised and retracted when lowered, a bucket at the front end of said booms and movable therewith, and means for emptying the bucket.

12. In a hydraulic digger and loader adapted to be mounted on a tractor provided with rear guards, telescopic booms positioned at the opposite sides of said tractor, means for pivotally mounting said booms to said rear guards whereby said mounting means takes the thrust of the booms, a bucket mounted on the forward ends of said booms, upright members mounted on opposite sides of said tractor, and means for guiding said booms along said members when the same are being raised or lowered.

13. In a hydraulic digger and loader adapted to be mounted on a tractor provided with rear guards, telescopic booms positioned at the opposite sides of said tractor, means for pivotally mounting said booms on said rear guards and rearwardly of the rear axle of said tractor whereby said mounting means takes the thrust of the booms, upright members mounted on opposite sides of said tractor and adjacent said booms, and means for guiding said booms along said members when the same are being raised or lowered.

In witness whereof, we hereunto subscribe our names to this specification.

PAUL BLUMBERG.
FRANK G. HOUGH.